United States Patent [19]

Niemann et al.

[11] 4,072,590
[45] Feb. 7, 1978

[54] METHOD FOR SEPARATING ISOTOPES FROM GASEOUS MIXTURES

[75] Inventors: Hans-Joachim Niemann; Eberhard Schuster; Arno Kersting, all of Erlangen, Germany

[73] Assignee: Kraftwerk Union Aktiengesellschaft, Mulheim (Ruhr), Germany

[21] Appl. No.: 577,897

[22] Filed: May 15, 1975

[30] Foreign Application Priority Data

May 20, 1974 Germany .............................. 2424728

[51] Int. Cl.² ................................................ B01J 1/10
[52] U.S. Cl. .................... 204/157.1 R; 204/DIG. 11; 250/527
[58] Field of Search ................ 204/157.1 R, DIG. 11, 204/158 R; 250/282, 527

[56] References Cited

U.S. PATENT DOCUMENTS 3,719,454  3/1973  Shang .......................... 204/DIG. 11

FOREIGN PATENT DOCUMENTS 2,312,194  10/1973  Germany ..................... 204/DIG. 11
1,284,620  8/1972   United Kingdom ........ 204/DIG. 11

OTHER PUBLICATIONS

Tiffany, et al., Science, vol. 157, (July 7, 1967), pp. 40–43.

*Primary Examiner*—Howard S. Williams
*Attorney, Agent, or Firm*—Kenyon & Kenyon, Reilly, Carr & Chapin

[57] ABSTRACT

To separate isotopes from a gaseous mixture containing isotopes and a chemical reaction partner, the reaction between the partner and the isotope to be separated can be directed by a laser beam having a narrow band of wave lengths molecularly exciting the isotope to be separated. To maximize such an effect, the gaseous mixture is held inside of a laser cavity chamber with the cavity chamber providing at both ends with completely reflecting end plates, the laser being operated to form a resonating wave which travels back and forth through the mixture.

2 Claims, 2 Drawing Figures

METHOD FOR SEPARATING ISOTOPES FROM GASEOUS MIXTURES

BACKGROUND OF THE INVENTION

It is possible to separate the isotopes of a chemical compound by causing a chemical reaction with one of the isotopes and a chemical reaction partner, providing the reaction can be guided or directed to occur between only the isotope to be separated and the partner.

In the case of gaseous mixtures such directing or guiding can be effected by passing a laser beam through the mixture and which has a wave length or narrow band of wave lengths, which excite the isotope to be separated, to a condition of resonance, so that as if that isotope had been heated, for example, its reaction with the chemical partner is promoted. To further promote the reaction, the partner itself may be excited by a laser beam.

For the execution of the above concepts a reaction chamber may be used having at one end a window through which the laser beam is projected, and the other end of the chamber may have a mirror for reflecting the beam. If the interior of the window is at least partially reflective, the beam may be made to pass back and forth through the chamber. This also applies to the case when two beams may be involved. In such a case a gas containing the isotopes can be caused to flow into the chamber through the beam intended for the excitation of the isotope while a gaseous partner is flowed into the chamber through the beam intended for its excitation. Being selective, the two beams perform their intended functions while passing back and forth through the mixture of gases in the chamber. However, the production of high energy laser beams presents difficulties at the present stage at which lasers have been developed, making it desirable to improve on the energy the beams can impart to the molecules of the mixture.

SUMMARY OF THE INVENTION

According to the present invention, the gaseous mixture containing the components of the desired reaction, is held directly within the cavity chamber of a laser at a position between the laser medium which is excited by the pumping radiation and the end plate of the cavity chamber which would normally be only partially reflecting in view of the ordinary desire to transmit the beam through that end plate. In the present instance, both end plates of the laser cavity chamber can be designed for complete reflection.

The gaseous mixture can be held in the resonator cavity chamber in a container having windows which pass the resonating wave within the resonator cavity chamber, as completely as possible.

BRIEF DESCRIPTION OF THE DRAWINGS

The accompanying drawings in an entirely schematic way illustrate the principles of the present invention, the various figures being as follows.

DETAILED DESCRIPTION OF THE INVENTION

Figure 1:
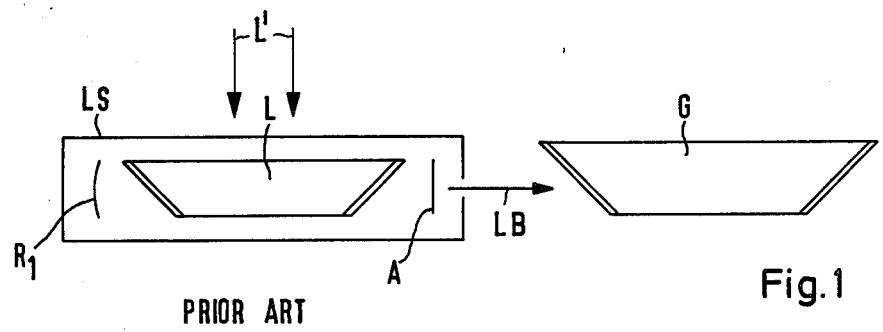
FIG. 1 shows the prior art manner for carrying out the described kind of isotope separation.

In the above drawings, FIG. 1 shows the laser cavity chamber LS containing the laser medium L which when excited by the pumping radiation L' produces the excited atoms which are reflected back and forth by the end plates $R_1$ and A, the end plate $R_1$ being as completely reflective as possible while the end plate A is only partly reflective, permitting the output radiation or beam LB to be projected and available for use. Entirely separately, the gaseous mixture is held in a chamber G closed off on both ends by Brewster windows which permit the substantially reflection-free transmission of the laser beam. If the right-hand end of the chamber G is made reflective, instead of being a window, and if the left-hand end is made partially reflective, the beam can be made to traverse the mixture in the chamber G several times to increase the desired excitation of one or the other of the isotopes included by the mixture.

However, the beam LB that is projected through the semi-reflective end plate A represents only a portion of the energy of the wave existing inside of the cavity chamber LS of the laser.

Figure 2:
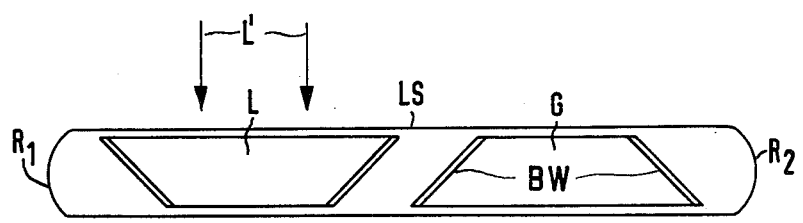
FIG. 2 shows the principles of the present invention.

According to the present invention, as shown by FIG. 2, the chamber G, which contains the mixture, is placed completely inside of the laser cavity LS which can, therefore, be advantageously lengthened. Both end plates of the cavity chamber LS, are now made as completely reflective as possible, the semi-reflective end plate A of FIG. 1 being replaced by a mirror $R_2$ which is made as reflective as possible. Now the wave built up in the cavity chamber LS by the excitation L', can build up to a resonance which may have an equilibrium with the adsorption line of the isotope which is desired to excite. If the partner is to be additionally excited, it can be heated prior to being brought together with the compound containing the mixture of isotopes. In any event, greater energy can be imparted to the isotope to be reacted with the partner, it being understood that the chamber G is provided with the Brewster windows BW at both ends so that the wave within the laser cavity chamber can be built up and maintained at resonance.

In the case of $UF_6$ a possible reaction partner is HCL. If the laser beam guides the U238 isotope so that it selectively reacts with the HCL, the concentration of U235 is increased. Both compounds in their gaseous phase represent an example of the gaseous mixture previously referred to.

What is claimed is:

1. A method for chemically separating isotopes from a gaseous mixture containing isotopes and a chemical reaction partner, by a reaction directed by a laser beam having a narrow band of wave lengths molecularly exciting mainly the isotope to be separated and thereby promoting its reaction with the reaction partner; wherein the improvement comprises holding said mixture inside of a laser resonator cavity chamber and forming a resonating wave within the cavity chamber passing through the mixture.

2. The method of claim 1 in which said wave is substantially completely reflected back and forth in the cavity chamber and through the mixture.

* * * * *